United States Patent [19]

Hodlewsky

[11] Patent Number: 4,711,605
[45] Date of Patent: Dec. 8, 1987

[54] KEY APPARATUS

[75] Inventor: Wasyly G. Hodlewsky, Greendale, Wis.

[73] Assignee: Rexnord Inc., Brookfield, Wis.

[21] Appl. No.: 869,159

[22] Filed: May 29, 1986

[51] Int. Cl.4 .......................... F16D 1/08; F16H 55/12
[52] U.S. Cl. ........................................ 403/355; 74/439
[58] Field of Search .................. 74/439, 448, 451, 446; 403/358, 357, 356, 355, 318, 319, 352

[56] References Cited

U.S. PATENT DOCUMENTS

| | | | |
|---|---|---|---|
| 2,239,623 | 4/1941 | Oster | 403/355 |
| 3,203,268 | 8/1965 | Manoni et al. | 403/375 |
| 3,362,734 | 1/1968 | Downie | 403/356 |
| 3,428,343 | 2/1969 | Downie | 403/358 |
| 3,436,106 | 4/1969 | Luenberger | 403/356 |
| 3,666,304 | 5/1972 | Wilder | 403/356 |
| 4,217,061 | 8/1980 | Eiland et al. | 403/356 |
| 4,411,550 | 10/1983 | Schutt et al. | 403/358 |

Primary Examiner—Cornelius J. Husar
Assistant Examiner—Peter M. Cuomo
Attorney, Agent, or Firm—Richard C. Ruppin

[57] ABSTRACT

A key for transferring rotating driving force between a driven and driving member. The key has a leg portion and a cross portion wider than and integral with the leg portion. The leg portion is positioned in a keyway of a first rotatable member and the cross portion is positioned in a keyway of a second rotable member. Rotating force applied to one of the rotating members is transferred to the other member through the keyways and the leg and cross portions of the key.

13 Claims, 5 Drawing Figures

KEY APPARATUS

This invention relates to a key for transferring rotating driving force between a driven and a driving member. More particularly, the invention relates to a key having a cross portion for transferring rotating driving force.

BACKGROUND OF INVENTION

A key is most typically an elongated, rectangular cross-section member positioned between a rotatable shaft and a device rotating with the shaft. A portion of the cross-section of the key is seated in a keyway disposed axially in the shaft and a portion of the cross-section is seated in a keyway in the device facing the shaft keyway. The key functions to transfer torque between the shaft and the device. Common types of devices which rotate with the shaft include sprockets, gears, pulleys and vehicle wheels. In apparatus comprising these types of devices, either the device or the shaft may be the driving member. A further use of keys, usually in conjunction with their torque transfer function, is for providing guidance when positioning a device axially on a shaft. Keys may be made of a variety of materials including steel, other metals, polymeric, and reinforced polymeric materials.

Various types of mechanisms utilize the principle of a key seated in a keyway for transferring rotating force from one rotating member to another. In these mechanisms, the key is not necessarily rectangular in cross-section and the overall mechanism of which the key is a part may perform functions in addition to rotational force transfer. Also, the force transfer may not be from one keyway to another through the key but, for example, may be through a shaft keyway and the key to a portion of the mechanism integral with the key and bolted to a driven member.

In virtually all types of keys used for rotational force transfer, the stresses induced in the key are substantial. Such stresses frequently lead to failure of the key and/or the driven or driving member. Consequently, keys as well as the members they are seated in are preferably made of a high compressive strength material such as steel, one of the materials previously mentioned. However, where light weight and lower cost materials and drive systems are desired, steel may not be the preferred choice for the keys and the associated drive members. Polymeric materials such as nylon, acetal and polyethylene are quite popular in lower cost drive systems. However, driven and driving members as well as keys made of these materials are somewhat lacking in physical strength properties and fail more quickly than such members made of steel. For example, where the key cross-section is rectangular and a portion of the crossection is seated in a keyway in a driving member and the balance of the cross-section is seated in a keyway in a driven member, the key is subject to failure due to torsional force about the axis of the keyway which causes the key to fail by rotation within the facing keyways of the driven and driving members. Part of this failure will involve deformation or disintegration of the keyway walls or the edges of the key, or both.

SUMMARY OF THE INVENTION

It is a general object of the invention to provide a key which has substantial ability to withstand the various types of forces to which keys are subjected when used to transfer rotating force between a driven and a driving member. In particular, it is an object of the invention to provide a key which is resistant to failure by rotation in its keyways.

The invention is accomplished by providing a key having a leg portion and a cross portion wider than and integral with the leg portion. The leg portion is positioned in a keyway of a first rotatable member and the cross portion is positioned in a keyway of a second rotatable member. Rotating force applied to one of the rotating members is transferred to the other member through the keyways and the leg and cross portions of the key.

The cross portion of the key may have both an end engaging a side of the keyway in the second member and a side means engaging the second member. Both the end and side means of the cross portion transfer rotating force between the members. The amount of stress on the end of the cross portion is thereby reduced and, in general, stress on the cross portion due to transfer of force through it is relatively distributed throughout the cross portion.

The key may have a generally T-shaped cross section and be made of a metal such as steel or a polymeric material. The T-shape is particularly effective in resisting failure of the key caused by rotation of the key within the keyways of the two rotating elements connected by the key.

BRIEF DESCRIPTION OF THE DRAWINGS

Further objects and advantages of the invention will appear when taken in conjunction with the accompanying drawings, in which.

DETAILED DESCRIPTION OF THE INVENTION

Figure 1:
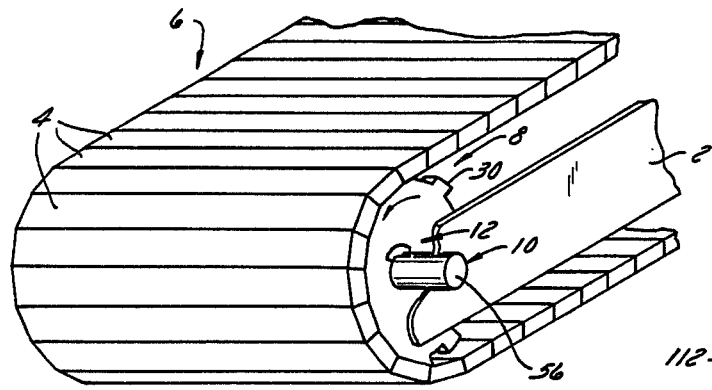
FIG. 1 is a perspective view of a conveyor having a shaft and sprocket in which the invention is utilized.

Referring to FIG. 1, a chain link conveyor is illustrated in which the key according to the invention may be utilized. The conveyor includes a frame member 2 and a plurality of conveyor links 4 connected together to form a continuous conveying chain 6. A sprocket drive wheel 8 having sprocket lugs 30 engages the chain links 4 to provide driving movement to the chain 6. A drive shaft 10 having a surface 56 is rotably mounted on the frame member 2 and the sprocket wheel 8 is in turn mounted on the shaft 10 and held to rotate with the shaft 10 by a key 12 such that rotation of the shaft provides torque, that is, rotating driving force, to the chain 6.

Figure 4:
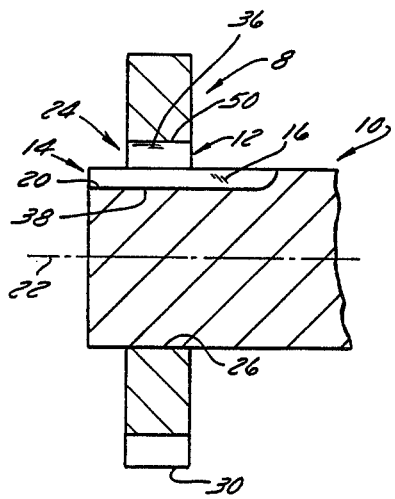
FIG. 4 is a cross-sectional view taken along the lines 4—4 of FIG. 2 with the key removed to illustrate the keyways of the shaft and sprocket.
Figure 2:
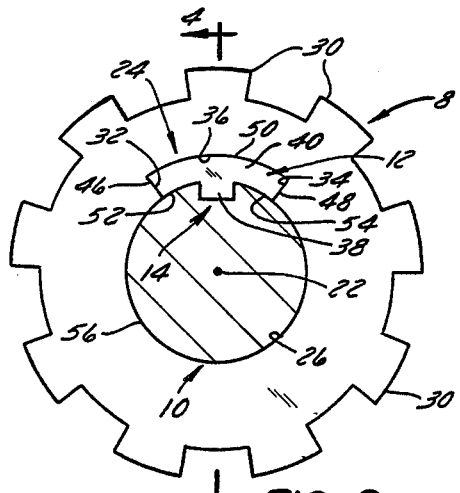
FIG. 2 is a side elevation view of a key according to the invention mounted between the shaft and sprocket shown in FIG. 1.
Figure 3:
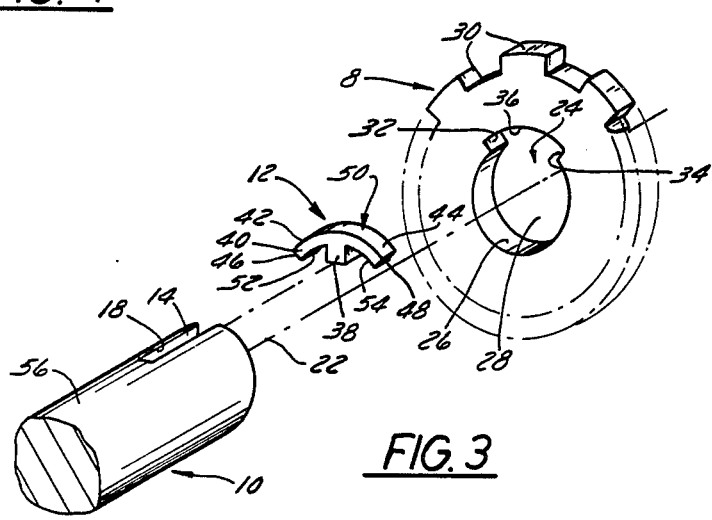
FIG. 3 is an exploded perspective view of the key, shaft and sprocket of FIGS. 1 and 2.

With reference to FIGS. 2-4, the drive shaft 10 includes a keyway 14 in which the key 12 is seated. The keyway 14 includes opposing sides 16 and 18, a side 20 connecting the sides 16 and 18 and has a length extending in the direction of the shaft axis designated by the numeral 22. A second keyway 24 is formed in the circumferential surface 26 of the opening 28 in the sprocket wheel 8. The keyway 24 includes opposing sides 32 and 34 and a side 36 connecting the sides 32 and 34. The sprocket wheel 8 fits on the shaft 10 as illustrated in FIG. 4 and, when the sprocket wheel is so positioned, the key 12 may be fitted on to the shaft 10 with the key 12 being received in the keyway 24 of the sprocket wheel 8 and the keyway 14 of the shaft 10 as shown in FIG. 2. When the key 12 is positioned in the keyways 14 and 24, the keyways will face each other and the length of the keyway 24 will extend in the direction of the shaft axis 22.

The key 12 has a leg portion 38 positioned in and engaging the sides of the shaft keyway 14 and a cross portion 40 integral with the leg portion 38 positioned in and engaging the keyway 24 of the sprocket wheel 8. The leg portion 38 of the key 12 has a width in the circumferential direction of the shaft 10 and the cross portion 40 also has a width in the circumferential direction of the shaft 10 which is wider than the width of the leg portion 38. Thus, depending on the exact location of the cross portion, the key 12 may be T-shaped or cross-shaped. However, the cross portion width does not extend in an angular direction beyond the center of the leg portion width greater than 90°. The cross portion further has ends 42 and 44 at least one of which engages an opposing side 32 or 34 of the keyway 24, depending on the direction of force applied to the key 12 as the sprocket wheel 8 and shaft 10 rotate. The end 42 includes a side 46 and the end 44 includes a side 48, one of which is the bearing surface when rotating force is applied to the key 12. The cross portion 40 of the key 12 further includes an outer circumferential surface 50 having an arcuate shape and a pair of inner circumferential surfaces 52 and 54 conforming to the shape of the surface 56 of the shaft 10. When the sprocket wheel 8 is mounted on the shaft 10 and the key 12 is in position in the keyways 14 and 24, the key 12 will generally be held in place with a friction fit in the keyway 14 and against the side 50 of the keyway 24 and at the point of engagement of the keyway sides 52 and 54 with the shaft surface 56.

Referring again to FIG. 1, when rotating driving force is applied to the shaft 10, the force will be applied to and transferred through the key 12 to the sprocket wheel 8. The transfer of force to the sprocket wheel 8 is accomplished by applying the force of the shaft in a direction transverse to the length of the keyways 14 and 24 through the keyway surfaces 16 or 18 to the leg portion 38 of the key 12. The key 12, as it rotates with the shaft 10, transfers the rotating force to the sprocket wheel 8 through either of the ends 42 or 44 of the cross portion 40 at the sides 46 or 48 which respectively bear against the sides 32 and 34 of the sprocket keyway 24. Rotating force is further transferred from the shaft 10 to the key 12 along the surface 56 of the shaft 10 through the inner circumferential surfaces 52 and 54 of the key 12 due to the friction fit of these surfaces. The stress due to the force applied to the key 12 by the shaft 10 and the stress in the key 12 due to the force it applies to the sprocket 8 are thus distributed throughout the body of the key 12. In particular, all of the stress induced in the key 12 due to its application of force to the sprocket wheel 8 does not occur in the leg portion 38 of the key 12. In contrast, all of this stress occurs within the rectangular cross section of a conventional type key. Stress distribution is also assisted by increasing the radial thickness of the cross portion 40 so that there is a larger bearing area of the side 46 against the side 32 of the sprocket keyway 24. An increase of the similar radial thickness in a conventional key would increase the tendency of the key to turn within its keyway. Because of a relatively wide cross portion, the key 12 is more capable of resisting such turning and shear forces. The distribution of stresses on the key 12 significantly increases its useful life and decreases frequent shutdowns of equipment relying on the key 12 for its operation.

It should be appreciated that the driving force could be applied to a member corresponding to the sprocket wheel 8 and transferred through the key 12 to a member corresponding to the shaft 10. Thus, the key 12 may accordingly be considered in a more general sense as a force transferring member between two rotatable members which engage each other with driving forces applied to either one of the members.

Figure 5:
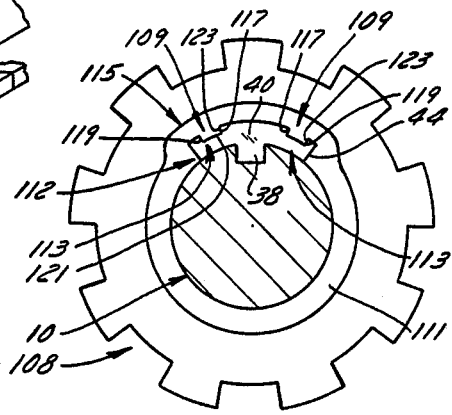
FIG. 5 is a side elevation view of another embodiment of the key according to the invention.

In FIG. 5 there is illustrated another embodiment of the invention in which the sprocket 108 includes a plurality of splines 109 and the key 112 has a corresponding plurality of grooves 113 each receiving one of the splines 109. In FIG. 5, only those elements of the embodiment of the invention which differ from corresponding elements shown in FIGS. 1-4 will be identified with different numerals. The sprocket 108 includes a hub 111 having an enlarged portion 115 along the outer circumferential area of the key 112. Each of the splines 109 are formed in the enlarged hub portion 115 and have sides 117, 119 extending in an axial direction. Each of the grooves 113 in the key 112 have side walls 121, 123 also extending in an axial direction and respectively engaging the sides 117, 119 of a spline 109.

When the shaft 10 applies rotating force through the key 112 to the sprocket 108, the rotating force is applied by the key 112 through the side walls 121 or 123 of the grooves 113 to the sides 117 or 119 of the splines as well as through the ends 42 or 44 of the key 112 to the sprocket hub 111. Such application of rotating force at a plurality of locations along the circumferential width of the key 112 reduces bearing pressure between the key and the sprocket at any one location and contributes to distribution of stress within the key 112 and decreases the likelihood of the key turning within the keyways.

The stress distribution and relatively greater cross portion width of the key according to the invention is of particular importance to the durability of the key and decreasing the possibility that the key will turn within its keyways. This is most significant where polymeric materials are used for rotatably driven members such as a sprocket wheel. This is due to the fact that polymeric materials, although having the benefits for use in rotatable drive applications previously discussed, have relatively low mechanical strength properties and thus are quite susceptible to failure due to high stress concentrations.

It will be understood that the foregoing description of the present invention is for purposes of illustration only and that the invention is susceptible to a number of modifications or changes, none of which entail any departure from the spirit and scope of the present invention as defined in the hereto appended claims. For example, the key position may be reversed so that the leg portion extends into the hub and the cross portion is in the shaft.

What is claimed is:

1. A key apparatus for transferring rotating force having a predetermined direction between first and second rotatable members engaging each other and respectively including first and second facing keyways having lengths transverse to the direction of the rotating force, the second keyway having a side positioned transversely to the direction of the rotating force, comprising:
  a key including:
    a leg portion having a width and being positioned in the first keyway; and
    a cross portion integral with the leg and having a width greater than the width of the leg, the cross portion being positioned in the second keyway of the second rotatable member and having an end engaging said transverse side of the second keyway at an angular distance from the leg portion whereby rotating force applied to one of the rotatable members is transferred to the other member through the keyways and through the leg and cross portions including the transverse side of the key.

2. The apparatus according to claim 1 wherein the key has a generally T-shaped cross-section comprising said leg and cross portions.

3. The apparatus according to claim 1 wherein:
  the rotatable members have an axis about which they move in response to the rotating force; and
  the cross portion of the key has a radial thickness and the leg portion has a radial thickness, the thickness of the cross portion being greater than the thickness of the leg portion.

4. The apparatus according to claim 3 wherein the cross portion and the second keyway have radially outward surfaces entirely in contact with each other.

5. The apparatus according to claim 1, 2, 3 or 4 wherein the second rotatable member comprises a polymeric material.

6. The apparatus according to claim 1, 2, 3, or 4 wherein:
  the rotatable members have an axis about which they move in response to the rotating force; and
  the cross portion has at least one end engaging the second keyway in the second rotatable member in a plane passing through said axis.

7. The apparatus according to claim 6 wherein the second rotatable member comprises a polymeric material.

8. The apparatus according to claim 6 wherein the angular distance between the leg portion and said end of the cross portion is not greater than 90°.

9. The apparatus according to claim 1 or 2 wherein:
  the rotatable members have an axis about which they move in response to the rotating force;
  the leg portion of the T-shaped cross-section extends radially relative to the axis and has a circumferential width centered on the axis; and
  said end of the cross portion is positioned an angular distance from said center of the width of the leg portion not greater than 90°.

10. The apparatus according to claim 1 wherein:
  the cross portion of the key has at least one groove facing the second keyway and having a length parallel to the length of the keyway; and
  the second keyway comprises a continuous recess having a radial depth in the second rotatable member and a spline within and parallel to the length of the second keyway, the spline extending radially into each groove of the key a distance less than the radial depth of the keyway.

11. The apparatus according to claim 10 wherein the cross portion has a plurality of said grooves and the second keyway has a corresponding plurality of said splines each extending into a groove.

12. The apparatus according to claim 11 wherein the second rotatable member is of a polymeric material.

13. The apparatus according to claim 9 wherein:
  the rotating members are rotatable about an axis;
  the leg portion of the T-shaped cross-section has a radial thickness, relative to the axis, within the keyway; and
  the cross portion of the T-shaped cross-section has a radial thickness, relative to the axis, within the keyway of the rotatable member that is greater than the thickness of the leg portion of the T-shaped cross-section.

* * * * *